(12) United States Patent
Hakura et al.

(10) Patent No.: US 9,406,101 B2
(45) Date of Patent: *Aug. 2, 2016

(54) TECHNIQUE FOR IMPROVING THE PERFORMANCE OF A TESSELLATION PIPELINE

(71) Applicant: NVIDIA Corporation, Santa Clara, CA (US)

(72) Inventors: Ziyad S. Hakura, Gilroy, CA (US); Zhenghong Wang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/829,461

(22) Filed: Mar. 14, 2013

(65) Prior Publication Data

US 2014/0267319 A1   Sep. 18, 2014

(51) Int. Cl.
*G06T 1/60* (2006.01)
*G06T 15/00* (2011.01)

(52) U.S. Cl.
CPC ................. *G06T 1/60* (2013.01); *G06T 15/005* (2013.01)

(58) Field of Classification Search
CPC ......... G06T 15/005; G06T 1/20; G06T 17/20; G06F 9/44; G06F 12/0808; G06F 12/0897
USPC ......................................... 345/501–522, 577
See application file for complete search history.

(56) References Cited

U.S. PATENT DOCUMENTS

| 7,839,410 B1 * | 11/2010 | Brown et al. ................ 345/541 |
| 2011/0080404 A1 * | 4/2011 | Rhoades et al. ............. 345/423 |
| 2014/0092091 A1 * | 4/2014 | Li et al. ........................ 345/423 |

* cited by examiner

*Primary Examiner* — Ming Hon
*Assistant Examiner* — Phuc Doan
(74) *Attorney, Agent, or Firm* — Artegis Law Group, LLP

(57) ABSTRACT

A tessellation pipeline includes an alpha phase and a beta phase. The alpha phase includes pre-tessellation processing stages, while the beta phase includes post-tessellation processing stages. A processing unit configured to implement a processing stage in the alpha phase stores input graphics data within a buffer and then copies over that buffer with output graphics data, thereby conserving memory resources. The processing unit may also copy output graphics data directly to a level 2 (L2) cache for beta phase processing by other tessellation pipelines, thereby avoiding the need for fixed function copy-out hardware.

23 Claims, 9 Drawing Sheets

CONCEPTUAL
DIAGRAM

TECHNIQUE FOR IMPROVING THE PERFORMANCE OF A TESSELLATION PIPELINE

BACKGROUND OF THE INVENTION

1. Field of the Invention

The present invention generally relates to graphics processing and, more specifically, to a technique for improving the performance of a tessellation pipeline.

2. Description of the Related Art

A conventional graphics processing unit (GPU) includes a plurality of different processing engines configured to operate in parallel with one another to process graphics data. The graphics data could be, for example, vertex data and associated vertex attributes, among other types of graphics data. Each processing engine may implement various processing stages within a graphics processing pipeline to process the graphics data. When a given processing engine finishes processing graphics data, that processing engine may cause a fixed-function, copy-out unit to copy the processed graphics data from local memory to a memory that is shared between the different processing engines. Other processing engines may then access the processed graphics data and then perform additional processing operations with that data.

One problem with the approach described above is that the overall throughput of the graphics processing pipeline is limited by the number of copy-out units configured to copy processed graphics data to shared memory for further processing. One solution to this problem is to incorporate additional copy-out units into the GPU. However, due to space constraints associated with GPU fabrication, this solution is usually undesirable.

As the foregoing illustrates, what is needed in the art is an improved technique for sharing data across processing engines in a graphics processing pipeline.

SUMMARY OF THE INVENTION

One embodiment of the present invention includes a graphics subsystem configured to implement a graphics processing pipeline that includes a first set of processing stages and a second set of processing stages, the graphics subsystem including a first processing engine configured to retrieve graphics object data from a first memory unit, perform a first graphics processing operation on the graphics object data at a first processing stage included in the first set of processing stages to generate processed graphics object data, determine that a second processing stage included in the first set of processing stages is the final processing stage in the first set of processing stages, and copy the processed graphics object data to the first memory unit, wherein the processed graphics object data overwrites at least a portion of the graphics object data within the first memory unit.

One advantage of the disclosed techniques is that the amount of graphics data processed in the first set of processing stages scales with the number of processing engines configured to implement those stages instead of scaling with the number of fixed-function copy-out units, thereby removing the bottleneck caused by those copy-out units.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
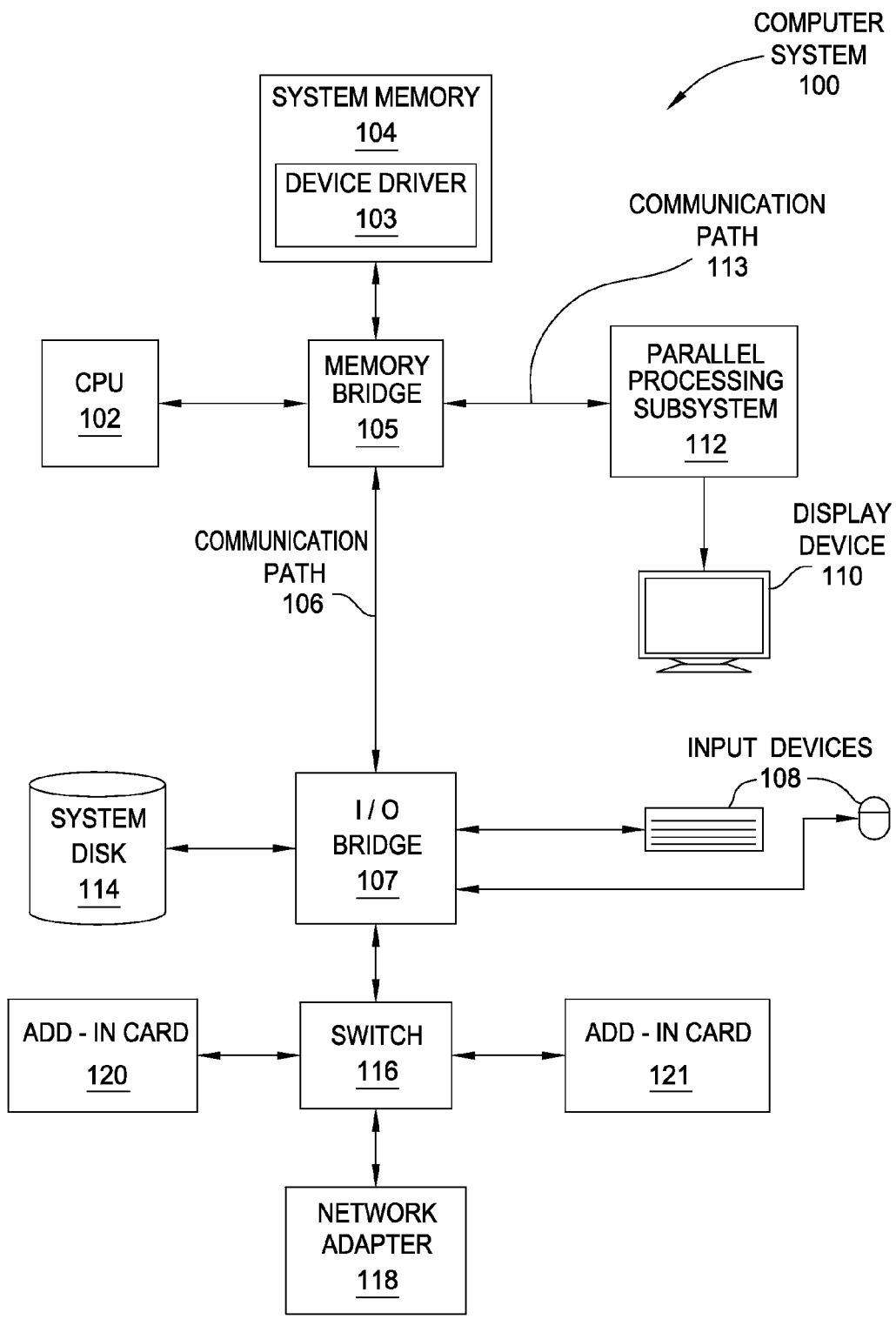
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
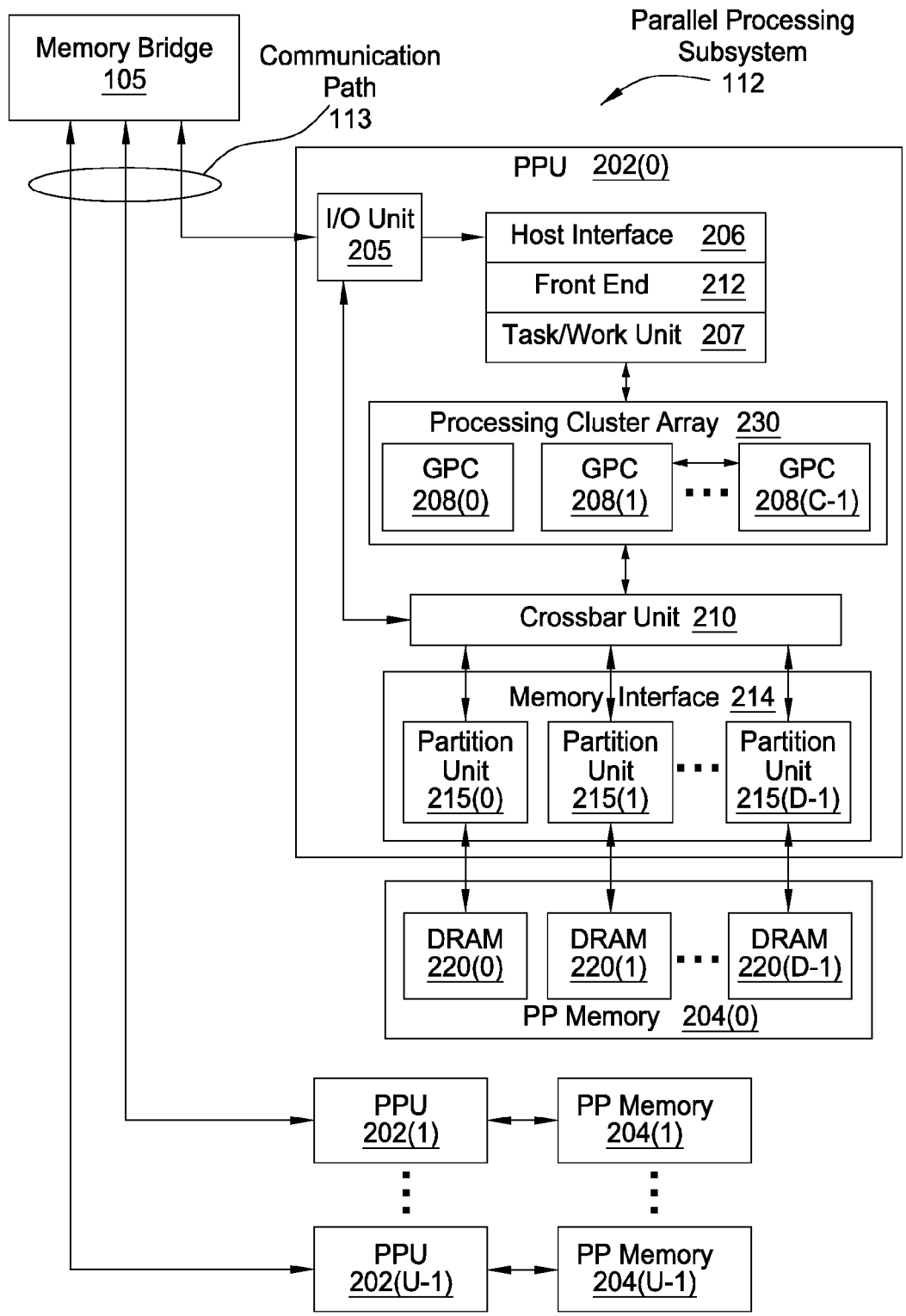
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
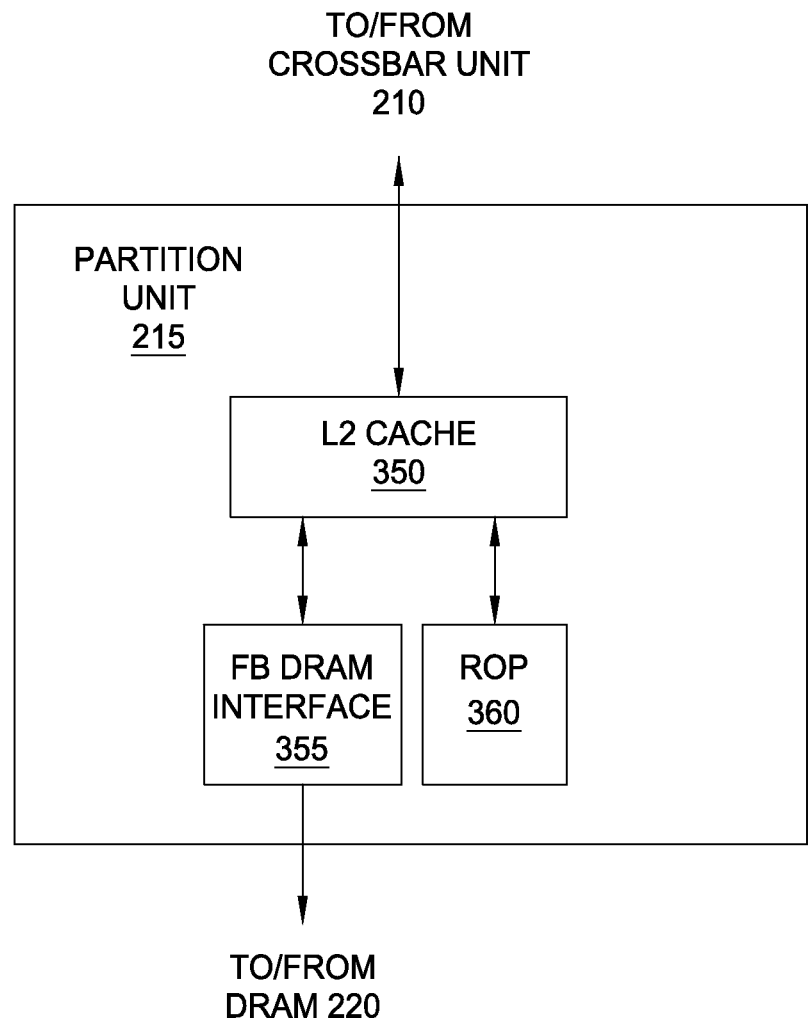
FIG. 3A is a block diagram of a partition unit within one of the PPUs of FIG. 2, according to one embodiment of the invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
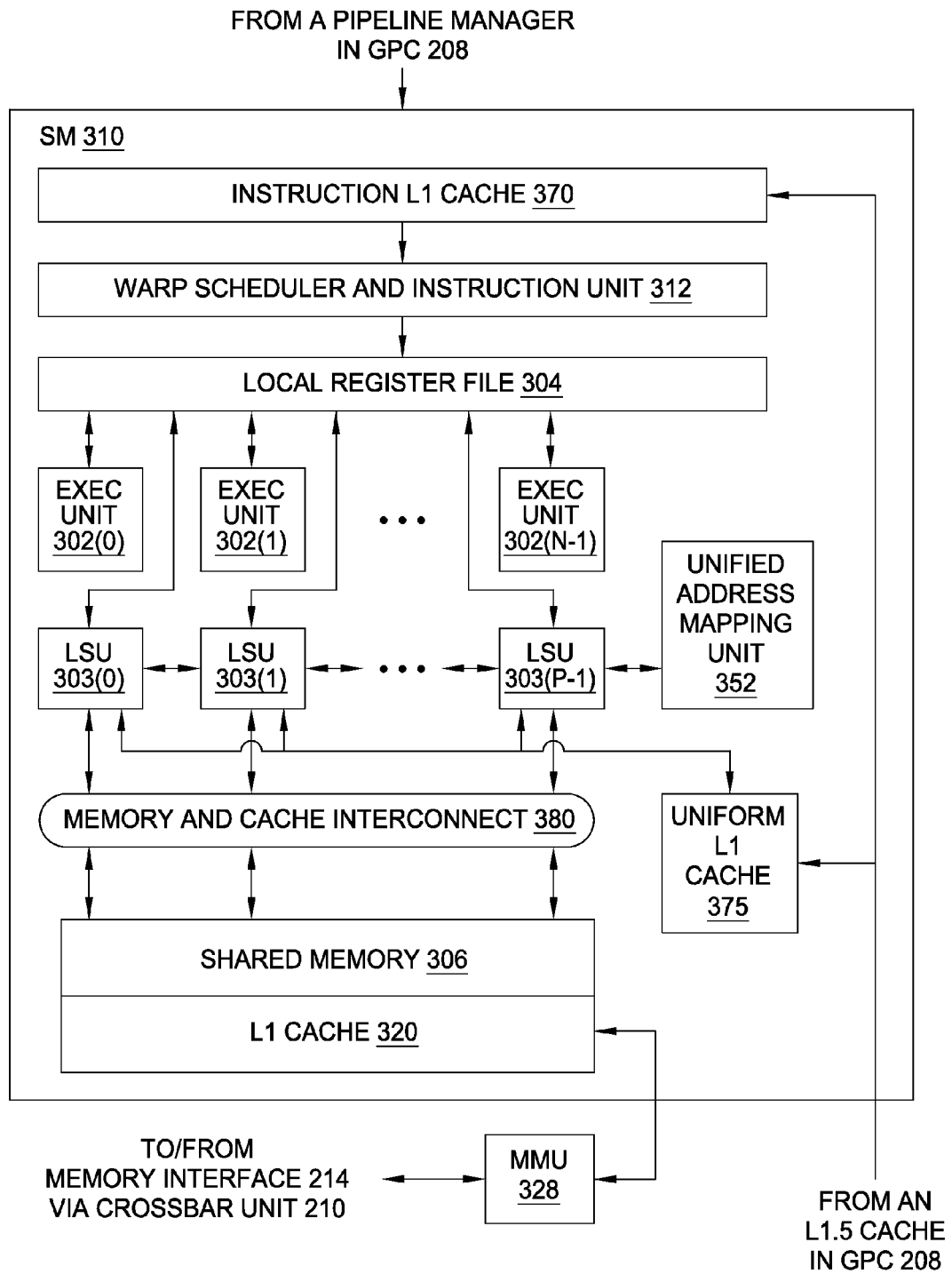
FIG. 3B is a block diagram of a portion of a streaming multiprocessor (SM) within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
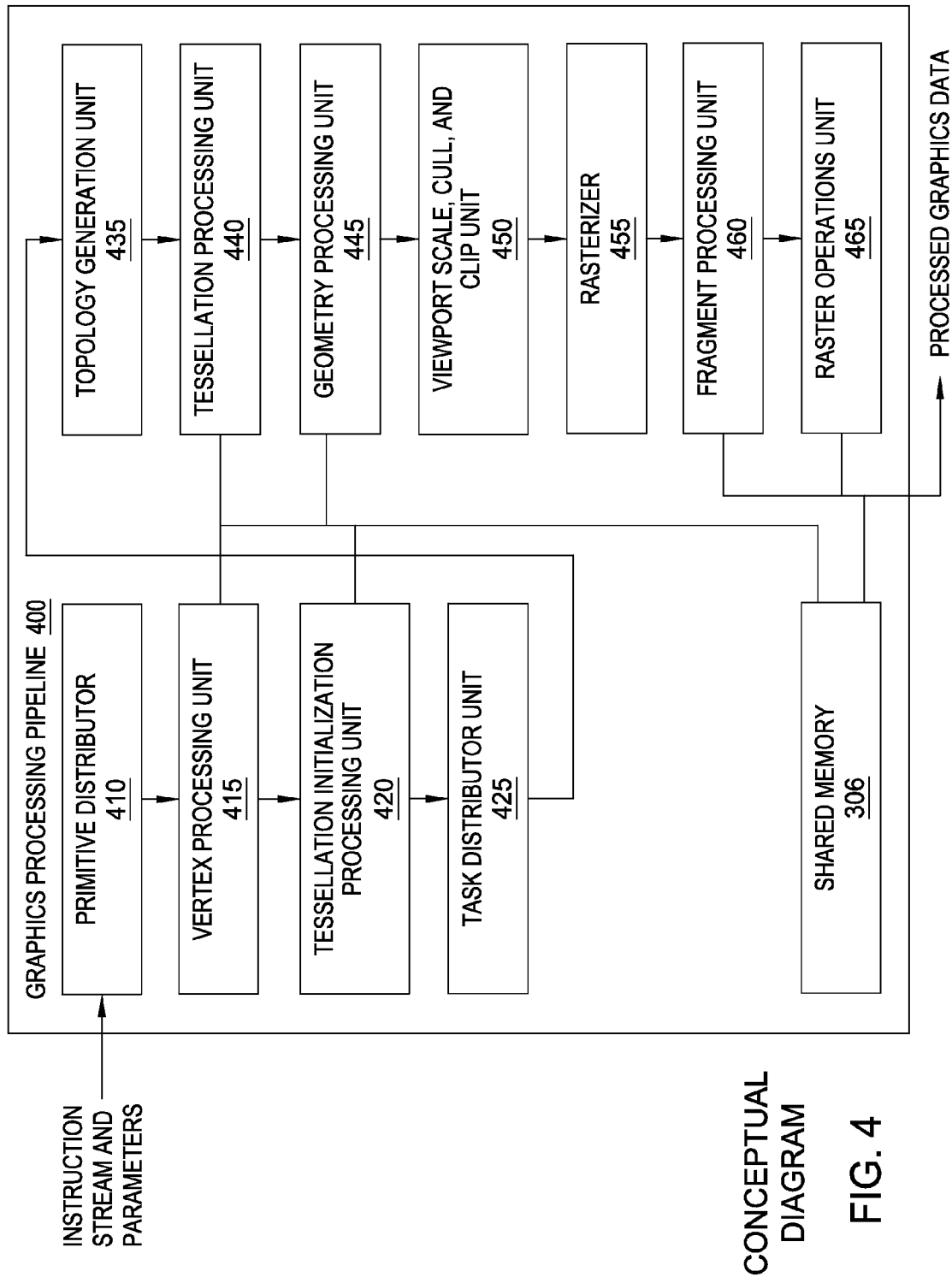
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a tessellation initialization processing unit 420, a tessellation processing unit 440, a geometry processing unit 445, and a fragment processing unit 460. The functions of primitive distributor 410, task generation unit 425, task distributor 430, topology generation unit 435, viewport scale, cull, and clip unit 450, rasterizer 455, and raster operations unit 465 may also be performed by other processing engines within a GPC 208 and a corresponding partition unit 215. Alternately, graphics processing pipeline 400 may be implemented using dedicated processing units for one or more functions.

The graphics processing pipeline 400 also includes a local memory that is shared among the graphics processing pipelines 400. For example, the graphics processing pipeline could use the shared memory 306 within the SM 310 as such a local memory. As further described below, inter-stage buffers (not shown) within the shared memory 306 are allocated and deallocated by the various processing units in the graphics processing pipeline 400 as needed. A processing unit reads input data from one or more inter-stage buffers, processes the input data to produce output data, and stores the resulting output data in one or more inter-stage buffers. A subsequent processing unit may read this resulting output data as input data for the subsequent processing unit. The subsequent processing unit processes the data and stores output data in one or more inter-stage buffers, and so on. The shared memory 306 and various other stages of the graphics processing pipeline connect with external memory via the memory interface 214.

The primitive distributor 410 processing unit collects vertex data for high-order surfaces, primitives, and the like, and outputs the vertex data, including the vertex attributes, to vertex processing unit 415. In some embodiments, the primitive distributor 410 includes a vertex attribute fetch unit (not shown) that retrieves the vertex attributes and stores the vertex attributes in the shared memory 306. The vertex processing unit 415 is a programmable execution unit that is configured to execute vertex shader programs, lighting and transforming vertex data as specified by the vertex shader programs. For example, the vertex processing unit 415 may be programmed to transform the vertex data from an object-based coordinate representation (object space) to an alternatively based coordinate system such as world space or normalized device coordinates (NDC) space. The vertex processing unit 415 may read data that is stored in shared memory 306, L1 cache 320, parallel processing memory 204, or system memory 104 by primitive distributor 410 for use in processing the vertex data. The vertex processing unit 415 stores processed vertices in the inter-stage buffers within the shared memory 306.

The tessellation initialization processing unit 420 is a programmable execution unit that is configured to execute tessellation initialization shader programs. The tessellation initialization processing unit 420 processes vertices produced by the vertex processing unit 415 and generates graphics primitives known as patches. The tessellation initialization processing unit 420 also generates various patch attributes. The tessellation initialization processing unit 420 then stores the patch data and patch attributes in the inter-stage buffers within the shared memory 306. In some embodiments, the tessellation initialization shader program may be called a hull shader or a tessellation control shader.

The task generation unit 425 retrieves data and attributes for vertices and patches from the inter-stage buffers of the shared memory 306. The task generation unit 425 generates tasks for processing the vertices and patches for processing by later stages in the graphics processing pipeline 400.

The task distributor 430 redistributes the tasks produced by the task generation unit 425. The tasks produced by the various instances of the vertex shader program and the tessellation initialization program may vary significantly between one graphics processing pipeline 400 and another. The task distributor 430 redistributes these tasks such that each graphics processing pipeline 400 has approximately the same workload during later pipeline stages.

The topology generation unit 435 retrieves tasks distributed by the task distributor 430. The topology generation unit 435 generates indices that describe tessellated primitives, including vertices associated with patches, and computes (u, v) coordinates corresponding to the vertices. The topology generation unit 435 then stores the indexed vertices in the inter-stage buffers within the shared memory 306.

The tessellation processing unit 440 is a programmable execution unit that is configured to execute tessellation shader programs. The tessellation processing unit 440 reads input data from and writes output data to the inter-stage buffers of the shared memory 306. This output data in the inter-stage buffers is passed to the next shader stage, the geometry processing unit 445 as input data. In some embodiments, the tessellation shader program may be called a domain shader or a tessellation evaluation shader.

The geometry processing unit 445 is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit 445 may be programmed to subdivide the graphics primitives into one or more new graphics primitives and calculate parameters, such as plane equation coefficients, that are used to rasterize the new graphics primitives.

In some embodiments, the geometry processing unit 445 may also add or delete elements in the geometry stream. The geometry processing unit 445 outputs the parameters and vertices specifying new graphics primitives to a viewport scale, cull, and clip unit 450. The geometry processing unit 445 may read data that is stored in shared memory 306, parallel processing memory 204 or system memory 104 for use in processing the geometry data. The viewport scale, cull, and clip unit 450 performs clipping, culling, and viewport scaling and outputs processed graphics primitives to a rasterizer 455.

The rasterizer 455 scan converts the new graphics primitives and outputs fragments and coverage data to fragment processing unit 460. Additionally, the rasterizer 455 may be configured to perform z culling and other z-based optimizations.

The fragment processing unit 460 is a programmable execution unit that is configured to execute fragment shader programs, transforming fragments received from the rasterizer 455, as specified by the fragment shader programs. For example, the fragment processing unit 460 may be programmed to perform operations such as perspective correction, texture mapping, shading, blending, and the like, to produce shaded fragments that are output to raster operations unit 465. The fragment processing unit 460 may read data that is stored in shared memory 306, parallel processing memory 204 or system memory 104 for use in processing the fragment data. Fragments may be shaded at pixel, sample, or other granularity, depending on the programmed sampling rate.

The raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory. In various embodiments, the ROP 465 may be located in the memory interface 214, in the GPCs 208, in the processing cluster array 230 outside of the GPCs, or in a separate unit (not shown) within the PPUs 202.

Improving the Performance of a Tessellation Pipeline

As described above in conjunction with FIG. 4, SMs 310 within one or more of the PPUs 202 of FIG. 2 may be configured to implement at least a portion of the graphics processing pipelines 400. An SM 310 may be configured to perform the functions of one or more of a vertex processing unit 415, a tessellation initialization processing unit 420, a tessellation processing unit 440, a geometry processing unit 445, and a fragment processing unit 460. The functions of primitive distributor 410, task generation unit 425, task distributor 430, topology generation unit 435, viewport scale, cull, and clip unit 450, rasterizer 455, and raster operations unit 465 may also be performed by other processing engines within a GPC 208 and a corresponding partition unit 215.

In some embodiments, each graphics processing pipeline 400 may be divided into a world space pipeline and a screen space pipeline. The world space pipeline processes graphics objects in 3D space, where the position of each graphics object is known relative to other graphics objects and relative to a 3D coordinate system. The screen space pipeline processes graphics objects that have been projected from the 3D coordinate system onto a 2D planar surface representing the surface of the display device 110. For example, the world space pipeline could include pipeline stages in the graphics processing pipeline 400 from the primitive distributor 410 through the viewport scale, cull, and clip unit 450. The screen space pipeline could include pipeline stages in the graphics processing pipeline 400 from the rasterizer 455 through the raster operations unit 465.

In some embodiments, each world space pipeline may be configured to support tessellation operations by implementing a tessellation pipeline. The tessellation pipeline may receive graphics objects and vertex attributes associated with those graphics objects. By performing various tessellation operations with those graphics objects and associated attributes, the tessellation pipeline may generate additional graphics objects and additional attributes. The processing stages of the tessellation pipeline that occur prior to tessellation may be included in an alpha phase of the tessellation pipeline, while the processing stages of the tessellation pipeline that occur after tessellation may be included in a beta phase of the tessellation pipeline.

In practice, a given SM 310 may implement alpha phase of the tessellation pipeline in order to generate processed graphics objects and associated attributes, and then one or more other SMs 310 may implement beta phase of the tessellation pipeline in order to further process those graphics objects and associated attributes. As referred to herein, graphics objects may be high-level graphics constructs, such as e.g. "large" polygons, or may be lower-level graphics constructs that could be derived from higher-level constructs, such as e.g. graphics primitives derived from a "large" polygon.

In certain situations, such as when SMs 310 are configured to render a portion of a graphics scene having a high level of detail (LOD), alpha phase processing may significantly expand the quantity of graphics objects and associated attributes. Consequently, the quantity of attributes received by processing stages within beta phase of the tessellation pipeline may be significantly larger than the quantity of attributes initially retrieved for processing stages within alpha phase of that pipeline. In such situations, beta phase processing may require significantly more time and resources that alpha phase processing. However, in other situations, such as when SMs 310 render a graphics scene having a low LOD, alpha phase processing and beta phase processing may require similar time and resources.

In either case (although, in particular the latter case), the performance of the tessellation pipeline, and, thus, of graphics processing pipeline 400 as a whole, is dependent on the efficiency of the alpha phase. The present invention relates to improving the efficiency of the alpha phase by (i) increasing the speed with which processed graphics objects and associated attributes may be copied out to memory, and (ii) reducing the amount of shared memory required by alpha phase, as discussed in greater detail below in conjunction with FIG. 5-8.

Figure 5:
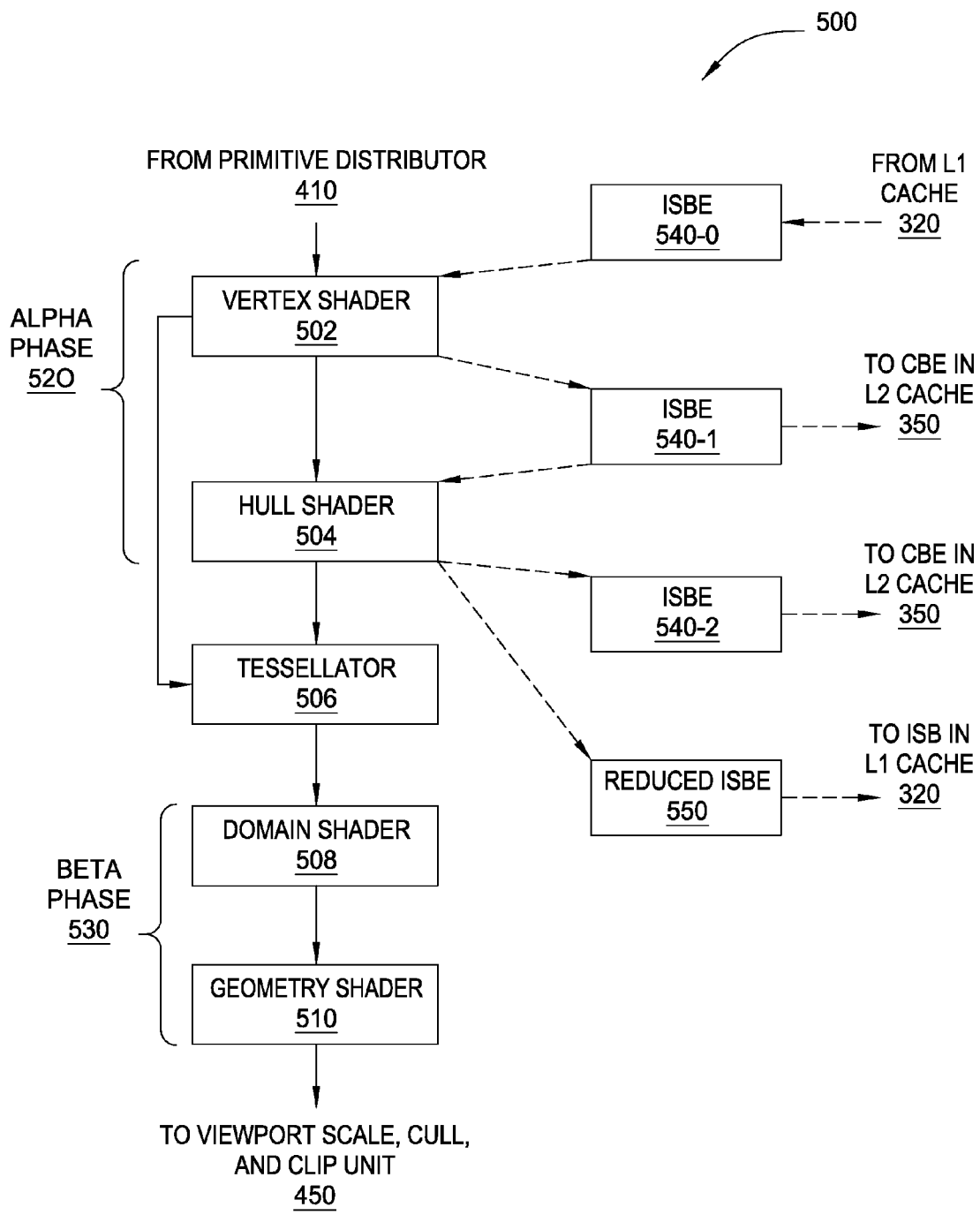
FIG. 5 is a conceptual diagram that illustrates a tessellation pipeline, according to one embodiment of the present invention.

FIG. 5 is a conceptual diagram that illustrates a tessellation pipeline 500, according to one embodiment of the invention. As shown, tessellation pipeline 500 includes a sequence of processing stages, including a vertex shader 502, a hull shader 504, a tessellator 506, a domain shader 508, and a geometry shader 510. As also shown, tessellation pipeline 500 is divided into an alpha phase 520 and a beta phase 530, where alpha phase 520 includes vertex shader 502 and hull shader 504, and beta phase 520 includes domain shader 508 and geometry shader 510. In one embodiment, hull shader 504 may be disabled. As described in greater detail below, a given SM 310 may be configured to implement processing stages within alpha phase 520, while one or more other SMs 310 may be configured to implement the processing stages within beta phase 530.

Some or all of the processing stages within tessellation pipeline 500 may be similar to a processing stage within graphics pipeline 400 discussed above in conjunction with FIG. 4. For example, vertex shader 502 could be implemented by vertex processing unit 405. Likewise, hull shader 504 could be implemented by tessellation initialization processing unit 420, tessellator 506 could be implemented by topology generation unit 435, domain shader 508 could be implemented by tessellation processing unit 440, and geometry shader 510 could be implemented by geometry processing unit 460.

In addition, a given processing stage within tessellation pipeline 500 may be implemented by a CTA executing on an SM 310 that configures the SM 310 to perform a particular function associated with that processing stage. The CTA may implement the given processing stage by executing software programs or by offloading various operations to fixed-function hardware units. Additionally, some processing stages within tessellation pipeline 500 may be implemented by a CTA associated with one SM 310, while other processing stages within tessellation pipeline 310 may be implemented by one or more other CTAs executing on one or more other SMs 310.

In practice, a given CTA that executes on a given SM 310 may implement processing stages within alpha phase 520, while other CTAs that execute on one or more other SMs 310 may implement processing stages within beta phase 530, in similar fashion as mentioned above. Thus, when the CTA configured to implement processing stages within alpha phase 520 significantly expands the quantity of graphics objects and associated attributes (e.g., due to tessellation operations), that CTA may re-distribute those objects and associated attributes to other CTAs configured to implement processing stages within beta phase 530.

When a CTA first launches on the SM 310 during alpha phase 520, one or more threads within a thread group within that CTA is configured to allocate a circular buffer entry (CBE) within L2 cache 350. The CBE is configured to store graphics object-related data, including graphics objects, vertex attributes, indices, and the like. The CTA is also configured to generate an inter-stage buffer (ISB) within L1 cache 320 for storage of processed graphics object data to be shared between processing stages within alpha phase 520. In one embodiment, primitive distributor 410 included within graphics pipeline 400 shown in FIG. 4 initially populates the ISB with graphics object data when the CTA first launches.

Vertex shader 502 within alpha phase 520 is configured to receive graphics object data from within an inter-stage buffer entry (ISBE) 540-0, as is shown. ISBE 540-0 is a data structure residing within the ISB mentioned above that includes vertex attributes, indices, primitive identifiers, patch data, and other types of graphics object data, as discussed in greater detail below in conjunction with FIG. 6. Vertex shader 502 is configured to execute vertex shader programs with the graphics object data within ISBE 540-0 in order to generate ISBE 540-1.

In embodiments where hull shader 504 is disabled, as discussed in greater detail below in conjunction with FIG. 7, vertex shader 502 is configured to write ISBE 540-1 directly to the CBE within L2 cache 350 that was allocated at the launch of the CTA. With this approach, vertex shader 502 not required to rely on external, fixed-function copy-out hardware to provide processed graphics object data, including vertex attributes, to other SMs 310 for beta phase processing. Accordingly, the ability of SMs 310 to output processed graphics object data generated by vertex shader 502 may scale with the number of SMs 310, instead of scaling with the number of external fixed-function copy-out hardware units.

In embodiments where hull shader 504 is enabled, as discussed in greater detail below in conjunction with FIG. 7, vertex shader 502 is configured to output ISBE 540-1 to the same portion of the ISB within L1 cache 320 that was previously configured to store ISBE 540-0. In other words, vertex shader 502 is configured to copy over ISBE 540-0 with ISBE 540-1. With this approach, the portion of ISB configured to store ISBE 540-0 or 540-1 may only need to be as large as the largest of ISBE 540-0 or ISBE 540-1. Consequently, vertex shader 502 may consume a reduced amount of shared memory compared to previous approaches that require shared memory to be allocated to vertex shader 502 for both input ISBE data and output ISBE data.

In embodiments where hull shader 504 is enabled, hull shader 504 is configured to retrieve ISBE 540-1 from the ISB within L1 cache 320 and execute various tessellation initialization operations with the processed graphics object data stored within that ISBE 540-1. In doing so, hull shader 504 is configured to generate ISBE 540-2 and to write that ISBE 540-2 directly to the CBE within L2 cache 350 that was allocated at the launch of the CTA. With this approach, the SM 310 is not required to rely on external, fixed-function copy-out hardware to provide graphics object data, including vertex attributes, generated by hull shader 504 to other SMs 310 for beta phase processing. Accordingly, the ability of SMs 310 to output data generated by hull shader 504 may scale with the number of SMs 310, instead of scaling with the number of external fixed-function copy-out hardware units.

In addition, hull shader 504 is also configured to generate a reduced ISBE 550 that includes LOD data generated by hull shader 504 based on ISBE 540-1. The LOD data may be required by subsequent task generation and tessellation stages associated with the SM 310 configured to perform alpha phase 520. Accordingly, hull shader 504 writes the reduced ISBE 550 to L1 cache 320 included within that SM 310. The subsequent tessellation and task generation stages within that SM 310 may then conveniently access the LOD data when generating tasks for other SMs 310.

Once alpha phase 520 completes (i.e. the last thread group within the CTA that configures the SM 310 to implement the processing stages within alpha phase 520 exits), tessellator 506 may access the reduced ISBE 550 and generate various tessellation tasks for other SMs 310. During beta phase 530, those other SMs 310 may implement domain shader 508 in order to perform tessellation shading operations, and geometry shader 510 in order to perform geometry shading operations and generate graphics primitives. The output of geometry shader 510 within a given SM 310 passes to viewport scale, cull, and clip unit 450 within that SM 310.

By implementing the approaches described above, graphics object data, including vertex attributes, generated via alpha phase 520 may be copied out to L2 cache 350 more efficiently than possible compared to previous approaches. Further, the amount of shared memory within L1 cache 320 required by alpha phase 520 may be reduced.

Figure 6:
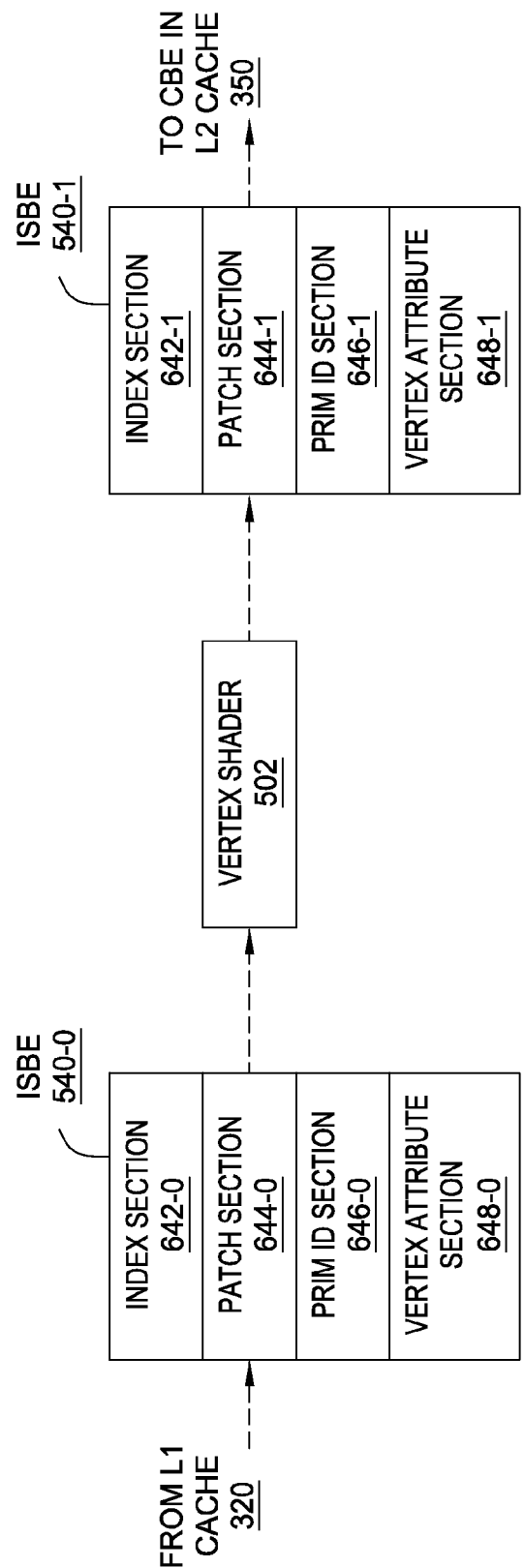
FIG. 6 is a conceptual diagram that illustrates graphics object data processed by the tessellation pipeline of FIG. 5 in greater detail, according to one embodiment of the present invention.

FIG. 6 is a conceptual diagram that illustrates graphics object data processed by tessellation pipeline 500 of FIG. 5 in greater detail, according to one embodiment of the invention. In the embodiment of the invention described herein, hull shader 504 is disabled. As shown, vertex shader 502 receives ISBE 540-0 from L1 cache 320 and generates ISBE 540-1. ISBE 540-0 includes various types of graphics object data, and includes an index section 642-0, a patch section 644-0, a primitive ID (primID) section 646-0, and a vertex attribute section 648-0. Likewise, ISBE 540-1 includes various types of graphics object data, and includes an index section 642-1, a patch section 644-1, a primID section 646-1, and a vertex attribute section 648-1.

Vertex shader 502 is configured to execute vertex shader programs with the graphics object data within ISBE 540-0 in order to generate the graphics object data within ISBE 540-1. Vertex shader 502 may then write ISBE 540-1 directly to the CBE within L2 cache 350 that was allocated at the start of the CTA. When vertex shader 502 is the final stage within alpha phase 520, as described herein, vertex shader 502 may also execute a MEMBAR.VC instruction in order to cause ISBE 540-1 to be committed to L2 cache 350 before any stages within beta phase 530 attempt to access that ISBE.

The MEMBAR.VC may be generally similar to a MEMBAR.GL instruction that may be executed by a generic client to cause data written by that client to be committed to memory before being accessed by other clients. However, the MEMBAR.VC instruction may be specifically executed by SM 310 to cause data written by that SM 310 to be committed to memory before being accessed by stages within beta phase 530.

The MEMBAR.VC instruction may not complete until prior global writes are committed, and may have reduced latency compared to the MEMBAR.GL instruction as a consequence of implementing fast x-bar write acknowledgements compared to the MEMBAR.GL instruction. Persons skilled in the art will recognize that other techniques for causing write data to be committed before that data is accessed may also be implemented by vertex shader 502 in place of the MEMBAR.VC instruction disclosed herein.

By avoiding reliance on fixed-function copy-out hardware via the approach described herein, vertex shader 502 may provide processed graphics object data to other SMs 310 configured to perform beta phase 530 (shown in FIG. 5) more efficiently.

Figure 7:
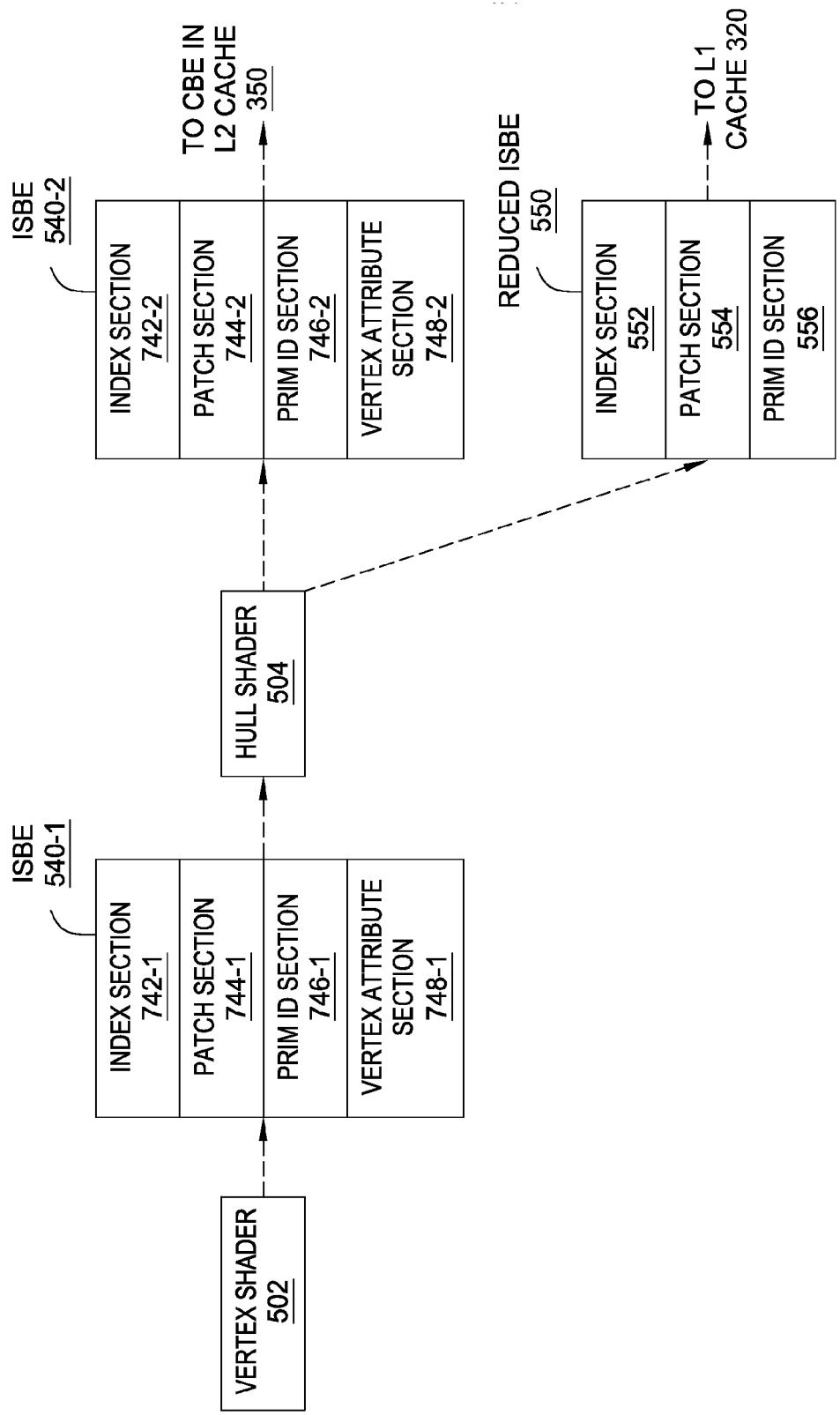
FIG. 7 is a conceptual diagram that illustrates graphics object data processed by the tessellation pipeline of FIG. 5 in greater detail, according to another embodiment of the present invention.

FIG. 7 is a conceptual diagram that illustrates graphics object data processed by the tessellation pipeline of FIG. 5 in greater detail, according to another embodiment of the invention. In the embodiment of the invention described herein, hull shader 504 is enabled. As shown, vertex shader 502 is configured to generate ISBE 540-1. Vertex shader 502 may then copy over ISBE 540-0 within L1 cache 320 with ISBE 540-1, thereby reducing the memory footprint required by vertex shader 502 within shared memory.

Hull shader 504 may then retrieve ISBE 540-1 from L1 cache 320 and generate ISBE 540-2 and reduced ISBE 550. As shown, ISBE 540-2 includes various types of graphics object data, and includes an index section 642-2, a patch section 644-2, a prim ID section 646-2, and a vertex attribute section 648-2. Reduced ISBE includes index section 552, patch section 554, and primID section 556.

Hull shader 504 is configured to execute tessellation initialization programs with the graphics object data within ISBE 540-1 in order to generate the graphics object data within ISBE 540-2. Hull shader 504 may then write ISBE 540-2 directly to the CBE within L2 cache 350 that was allocated at the start of the CTA. When hull shader 504 is the final stage within alpha phase 520, as described herein, hull shader 504 may also execute the MEMBAR.VC instruction described above in conjunction with FIG. 6 in order to cause ISBE 540-1 to be committed to L2 cache 350 before any stages within beta phase 530 attempt to access that ISBE. Persons skilled in the art will recognize that other techniques for causing write data to be committed before that data is accessed may also be implemented by hull shader 504 in place of the MEMBAR.VC instruction disclosed herein.

By avoiding reliance on fixed-function copy-out hardware, hull shader 504 may provide processed graphics object data to other SMs 310 configured to perform beta phase 530 (shown in FIG. 5) more efficiently.

Hull shader 504 is also configured to write reduced ISBE 550 to the ISB within L1 cache 320. The graphics object data within reduced ISBE 550 includes data that may be required by subsequent task generation and tessellation stages associated with the SM 310 configured to implement hull shader 504. Accordingly, that SM 310 may conveniently access the data within reduced ISBE 550 when generating tasks for other SMs 310.

By causing vertex shader 502 to copy over ISBE 540-0 with ISBE 540-1, in conjunction with causing hull shader 504 to write ISBE 540-2 directly to the CBE within L2 cache 550, tessellation pipeline 500 may consume a reduced amount of shared memory and provide processed graphics object data to other SMs 310 more efficiently.

Figure 8:
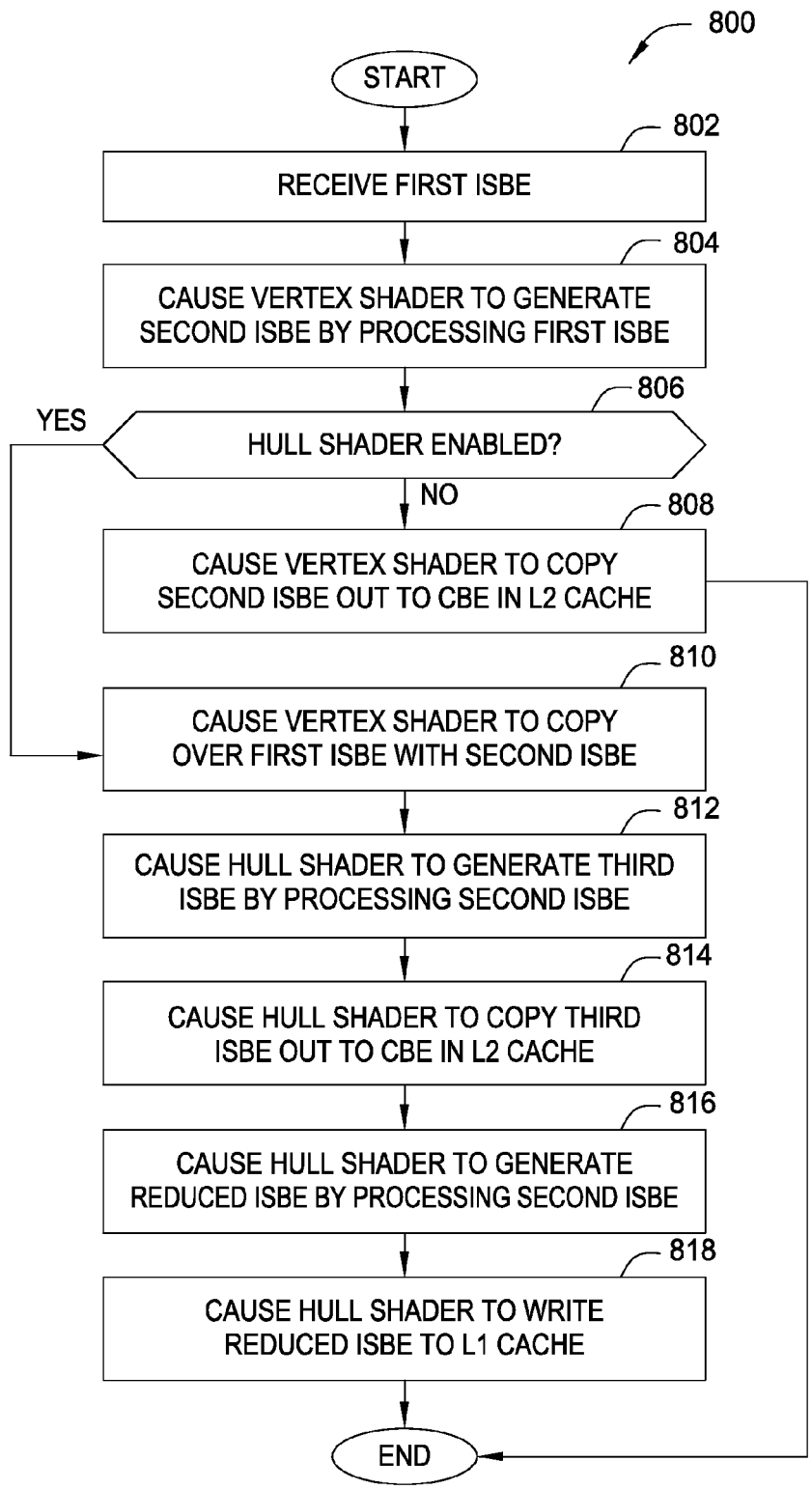
FIG. 8 is a flow diagram of method steps for copying processed graphics object data to memory, according to one embodiment of the present invention.

FIG. 8 is a flow diagram of method steps for copying processed graphics object data to shared memory, according to one embodiment of the invention. Although the method steps are described in conjunction with the systems of FIGS. 1-3B, persons skilled in the art will understand that any system configured to perform the method steps, in any order, is within the scope of the present invention.

As shown, a method 800 begins at step 802, where vertex shader 502 within tessellation pipeline 500 receives ISBE 540-0. ISBE 540-0 is a data structure that includes graphics object data, such as index data, patch data, primID data, and vertex attribute data. At step 804, vertex shader 502 generates ISBE 540-1 by executing vertex shader programs with the graphics object data within ISBE 540-1. At step 806, vertex shader 502 determines whether hull shader 504 is enabled. If vertex shader 502 determines that hull shader 504 is not enabled, then the method 800 proceeds to step 808. At step 808, vertex shader 502 writes ISBE 540-1 directly to the pre-allocated CBE within L2 cache 350.

If vertex shader 502 determines that hull shader 504 is enabled, then the method 800 proceeds to step 810, where vertex shader 502 copies ISBE 540-1 over ISBE 540-0 within L1 cache 320. At step 812, hull shader 504 generates ISBE 540-2 by executing tessellation initialization programs with ISBE 540-1. At step 814, hull shader 504 writes ISBE 540-2 directly to the pre-allocated CBE within L2 cache 350.

At step 816, hull shader 504 generates reduced ISBE 550 by processing ISBE 540-1. As discussed above, reduced ISBE 550 includes LOD-related data, including index data, patch data, and primitive IDs. At step 818, hull shader 504 writes reduced ISBE 550 to L1 cache 320. Subsequent processing stages associated with SM 310 may then access reduced ISBE 550 when performing tessellation or task generation operations.

In sum, a tessellation pipeline includes an alpha phase and a beta phase. The alpha phase includes pre-tessellation processing stages, while the beta phase includes post-tessellation processing stages. A processing unit configured to implement a processing stage in the alpha phase stores input graphics data within a buffer and then copies over that buffer with output graphics data, thereby conserving memory resources. The processing unit may also copy output graphics data directly to a level 2 (L2) cache for beta phase processing by other tessellation pipelines, thereby avoiding the need for fixed function copy-out hardware.

Advantageously, the amount of graphics data processed in the alpha phase of the tessellation pipeline scales with the number of SMs instead of with the number of fixed-function copy-out units, thereby removing the bottleneck caused by those copy-out units. In addition, the tessellation pipeline may require a smaller shared memory footprint compared to previous approaches, thereby conserving memory resources.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A graphics subsystem configured to implement a graphics processing pipeline that includes a first set of processing stages and a second set of processing stages, the graphics subsystem comprising:
   a first processing engine configured to:
      retrieve graphics object data from a first memory unit;
      perform a first graphics processing operation on the graphics object data at a first processing stage included in the first set of processing stages to generate processed graphics object data;

determine whether a second processing stage included in the first set of processing stages is enabled; and when the second processing stage is enabled, copy the processed graphics object data to the first memory unit, wherein the processed graphics object data overwrites at least a portion of the graphics object data within the first memory unit.

2. The graphics subsystem of claim 1, wherein the first processing engine is further configured to:

retrieve the processed graphics object data from the first memory unit;

perform a second graphics processing operation on the processed graphics object data at the second processing stage to generate additional processed graphics object data; and copy the additional processed graphics object data to a second memory unit that is accessible by one or more processing engines that are configured to implement the second set of processing stages with the additional processed graphics data stored in the second memory unit.

3. The graphics subsystem of claim 2, wherein the first graphics processing operation comprises a vertex shading operation that is included in a vertex shader program executed by the first processing engine, and wherein the second graphics processing operation comprises a tessellation initialization operation included in a tessellation initialization program executed by the first processing engine.

4. The graphics subsystem of claim 2, wherein the first memory unit comprises a Level-1 cache that is coupled to the first processing engine and is configured to store the graphics object data and the processed graphics object data within an inter-stage buffer entry, and wherein the second memory unit comprises a Level-2 cache that is coupled to the first processing engine and to the one or more processing engines and is configured to store the additional processed graphics object data within a circular buffer entry.

5. The graphics subsystem of claim 2, wherein the first processing engine is further configured to:

perform a third graphics processing operation on the processed graphics object data at the second processing stage to generate reduced graphics object data; and copy the reduced graphics object data to the first memory unit.

6. The graphics subsystem of claim 5, wherein the reduced graphics object data includes at least one of index data, patch data, and primitive identification data, but does not include vertex attribute data.

7. The graphics subsystem of claim 6, wherein the third graphics processing operation comprises a task generation operation executed by the first processing engine.

8. The graphics subsystem of claim 7, wherein the first processing engine is configured to perform the task generation operation on the reduced graphics object data to generate one or more tasks for execution by the one or more processing engines when the one or more processing engines implement the second set of processing stages.

9. A computing device, comprising:

a first memory unit;

a second memory unit; and a graphics processing pipeline that has a first set of processing stages and a second set of processing stages, the graphics processing pipeline including:

a first processing engine configured to:

retrieve graphics object data from the first memory unit;

perform a first graphics processing operation on the graphics object data at a first processing stage included in the first set of processing stages to generate processed graphics object data;

determine whether a second processing stage included in the first set of processing stages is enabled; and when the second processing stage is enabled, copy the processed graphics object data to the first memory unit, wherein the processed graphics object data overwrites at least a portion of the graphics object data within the first memory unit.

10. The computing device of claim 9, wherein the first processing engine is further configured to:

retrieve the processed graphics object data from the first memory unit;

perform a second graphics processing operation on the processed graphics object data at the second processing stage to generate additional processed graphics object data; and copy the additional processed graphics object data to a second memory unit that is accessible by one or more processing engines that are configured to implement the second set of processing stages with the additional processed graphics data stored in the second memory unit.

11. The computing device of claim 10, wherein the first graphics processing operation comprises a vertex shading operation that is included in a vertex shader program executed by the first processing engine, and wherein the second graphics processing operation comprises a tessellation initialization operation included in a tessellation initialization program executed by the first processing engine.

12. The computing device of claim 10, wherein the first memory unit comprises a Level-1 cache that is coupled to the first processing engine and is configured to store the graphics object data and the processed graphics object data within an inter-stage buffer entry, and wherein the second memory unit comprises a Level-2 cache that is coupled to the first processing engine and to the one or more processing engines and is configured to store the additional processed graphics object data within a circular buffer entry.

13. The computing device of claim 10, wherein the first processing engine is further configured to:

perform a third graphics processing operation on the processed graphics object data at the second processing stage to generate reduced graphics object data; and copy the reduced graphics object data to the first memory unit.

14. The computing device of claim 13, wherein the reduced graphics object data includes at least one of index data, patch data, and primitive identification data, but does not include vertex attribute data.

15. The computing device of claim 14, wherein the third graphics processing operation comprises a task generation operation executed by the first processing engine.

16. The computing device of claim 15, wherein the first processing engine is configured to perform the task generation operation on the reduced graphics object data to generate one or more tasks for execution by the one or more processing engines when the one or more processing engines implement the second set of processing stages.

17. A computer-implemented method for processing graphics object data in a graphics processing pipeline that includes a first set of processing stages and a second set of processing stages, the method comprising:

retrieving graphics object data from a first memory unit;

performing a first graphics processing operation on the graphics object data at a first processing stage included in the first set of processing stages to generate processed graphics object data;

determining whether a second processing stage included in the first set of processing stages is; and when the second processing state is enabled, copying the processed graphics object data to the first memory unit, wherein the processed graphics object data overwrites at least a portion of the graphics object data within the first memory unit.

18. The computer-implemented method of claim 17, further comprising:

retrieving the processed graphics object data from the first memory unit;

performing a second graphics processing operation on the processed graphics object data at the second processing stage to generate additional processed graphics object data; and copying the additional processed graphics object data to a second memory unit that is accessible by one or more processing engines that are configured to implement the second set of processing stages with the additional processed graphics data stored in the second memory unit.

19. The computer-implemented method of claim 18, further comprising:

performing a third graphics processing operation on the processed graphics object data at the second processing stage to generate reduced graphics object data; and copying the reduced graphics object data to the first memory unit.

20. The computer-implemented method of claim 19, wherein the reduced graphics object data includes at least one of index data, patch data, and primitive identification data, but does not include vertex attribute data, wherein the third graphics processing operation comprises a task generation operation executed by the first processing engine, and wherein the first processing engine is configured to perform the task generation operation on the reduced graphics object data to generate one or more tasks for execution by the one or more processing engines when the one or more processing engines implement the second set of processing stages.

21. The graphics subsystem of claim 1, wherein, when the second processing stage is not enabled, the first processing engine is further configured to copy the processed graphics object data to a second memory unit that is accessible by one or more processing engines that are configured to implement the second set of processing stages.

22. The computing device of claim 9, wherein, when the second processing stage is not enabled, the first processing engine is further configured to copy the processed graphics object data to a second memory unit that is accessible by one or more processing engines that are configured to implement the second set of processing stages.

23. The computer-implemented method of claim 17, further comprising, when the second processing stage is not enabled, copying the processed graphics object data to a second memory unit that is accessible by one or more processing engines that are configured to implement the second set of processing stages.

* * * * *